(12) United States Patent
Diewald et al.

(10) Patent No.: US 9,612,834 B2
(45) Date of Patent: Apr. 4, 2017

(54) PROCESSOR WITH VARIABLE INSTRUCTION ATOMICITY

(71) Applicant: Texas Instruments Deutschland GmbH, Freising OT (DE)

(72) Inventors: Horst Diewald, Freising (DE); Johann Zipperer, Unterschleissheim (DE)

(73) Assignee: TEXAS INSTRUMENTS DEUTSCHLAND GMBH, Freising (DE)

( * ) Notice: Subject to any disclaimer, the term of this patent is extended or adjusted under 35 U.S.C. 154(b) by 748 days.

(21) Appl. No.: 13/628,366

(22) Filed: Sep. 27, 2012

(65) Prior Publication Data

US 2014/0089640 A1 Mar. 27, 2014

(51) Int. Cl.
- *G06F 15/00* (2006.01)
- *G06F 7/38* (2006.01)
- *G06F 9/00* (2006.01)
- *G06F 9/44* (2006.01)
- *G06F 9/30* (2006.01)
- *G06F 9/38* (2006.01)

(52) U.S. Cl.
CPC .......... *G06F 9/30065* (2013.01); *G06F 9/381* (2013.01); *G06F 9/3814* (2013.01); *G06F 9/3822* (2013.01); *G06F 9/3853* (2013.01)

(58) Field of Classification Search
CPC .............................. G06F 9/466; G06F 9/30185
USPC ......................................................... 712/220
See application file for complete search history.

(56) References Cited

U.S. PATENT DOCUMENTS

| | | | | |
|---|---|---|---|---|
| 5,826,053 | A | * | 10/1998 | Witt .............................. 712/210 |
| 2010/0205408 | A1 | * | 8/2010 | Chung et al. ................ 712/216 |
| 2012/0079245 | A1 | * | 3/2012 | Wang .................. G06F 9/30072 |
| | | | | 712/208 |

* cited by examiner

*Primary Examiner* — Chun-Kuan Lee

(74) *Attorney, Agent, or Firm* — John R. Pessetto; Charles A. Brill; Frank D. Cimino

(57) ABSTRACT

A processor includes a plurality of execution units. At least one of the execution units is configured to execute a complex instruction that requires multiple instruction cycles to execute, and to enforce atomic execution of the complex instruction during a first-portion of the multiple instruction cycles required to execute the complex instruction. The at least one of the execution units is further configured to enable execution of the complex instruction to be interrupted for execution of a different instruction by the at least one execution unit during execution of a second portion of the multiple instruction cycles. The first portion and the second portion are non-overlapping.

26 Claims, 3 Drawing Sheets

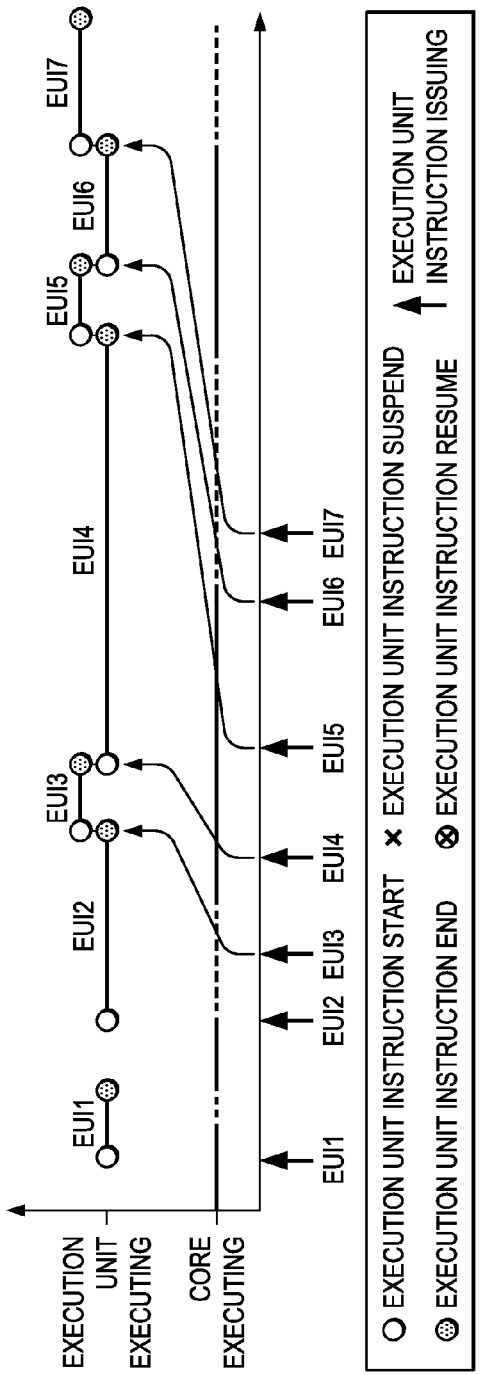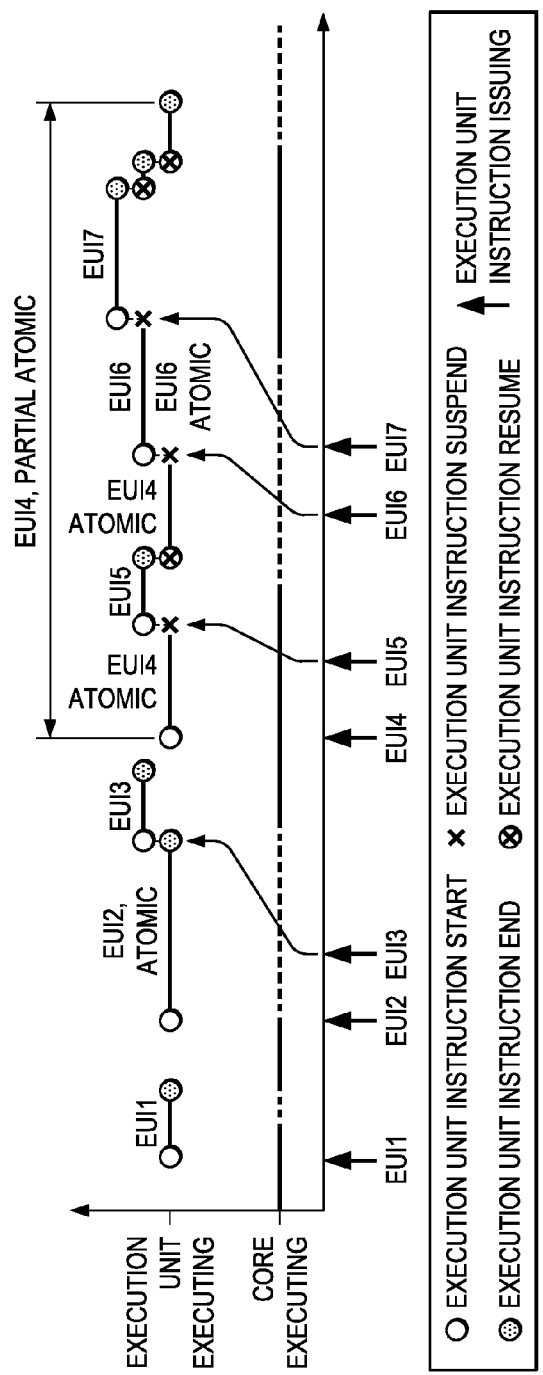

PROCESSOR WITH VARIABLE INSTRUCTION ATOMICITY

BACKGROUND

Microprocessors (processors) are instruction execution devices that are applied, in various forms, to provide control, communication, data processing capabilities, etc. to an incorporating system. Processors include execution units to provide data manipulation functionality. Exemplary execution units may provide arithmetic operations, logical operations, floating point operations etc. Processors invoke the functionality of the execution units in accordance with the requirements of the instructions executed by the processor.

SUMMARY

A processor and execution unit providing variable instruction execution atomicity are disclosed herein. In one embodiment, a processor includes a plurality of execution units. At least one of the execution units is configured to execute a complex instruction that requires multiple instruction cycles to execute, and to enforce atomic execution of the complex instruction during a first-portion of the multiple instruction cycles required to execute the complex instruction. The at least one of the execution units is further configured to enable execution of the complex instruction to be interrupted for execution of a different instruction by the at least one execution unit during execution of a second portion of the multiple instruction cycles. The first portion and the second portion of the multiple instruction cycles are non-overlapping.

In another embodiment, an execution unit for executing instructions in a processor includes instruction execution logic. The instruction execution logic is configured to execute a complex instruction that requires a plurality of instruction cycles to execute, and to impose atomic execution of the complex instruction during a first-portion of the plurality of instruction cycles required to execute the complex instruction. The instruction execution logic is also configured to enable execution of the complex instruction to be interrupted for execution of a different instruction by the execution unit during execution of a second portion of the plurality of instruction cycles. The first portion and the second portion are non-overlapping.

In a further embodiment, a method for executing an instruction in an execution unit of a processor includes executing, by the execution unit, a complex instruction requiring a plurality of instruction cycles to execute. Atomic execution of the complex instruction is enforced, by the execution unit, during a first portion of the plurality of instruction cycles required to execute the complex instruction. Interrupting of execution of the complex instruction for execution of a different instruction is enabled, by the execution unit, during execution of a second portion of the plurality of instruction cycles. The first portion and the second portion do not overlap.

BRIEF DESCRIPTION OF THE DRAWINGS

For a detailed description of exemplary embodiments of the invention, reference will now be made to the accompanying drawings in which:

FIG. 4 shows an exemplary instruction flow incorporating fully atomic execution of instructions in accordance with various embodiments;

FIG. 5 shows an exemplary instruction flow incorporating partially atomic execution of instructions in accordance with various embodiments.

NOTATION AND NOMENCLATURE

Figure 1:
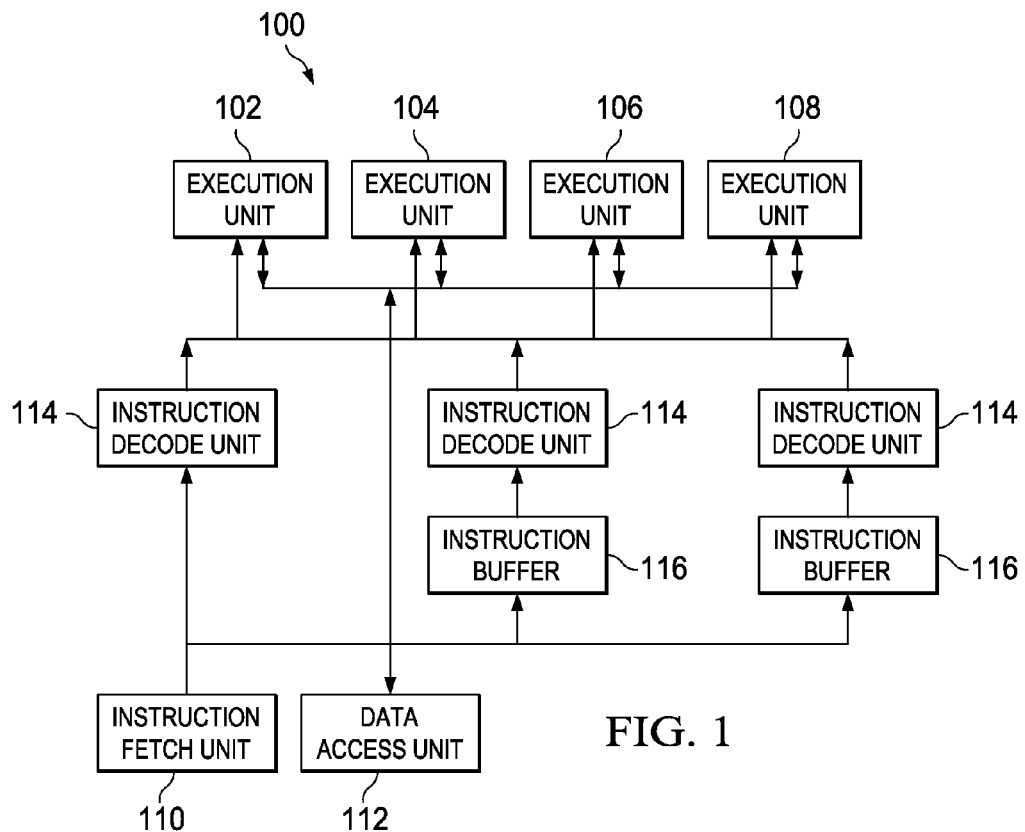
FIG. 1 shows a block diagram of a processor in accordance with various embodiments.

Certain terms are used throughout the following description and claims to refer to particular system components. As one skilled in the art will appreciate, companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ." Also, the term "couple" or "couples" is intended to mean either an indirect or direct electrical connection. Thus, if a first device couples to a second device, that connection may be through a direct electrical connection, or through an indirect electrical connection via other devices and connections. Further, the term "software" includes any executable code capable of running on a processor, regardless of the media used to store the software. Thus, code stored in memory (e.g., non-volatile memory), and sometimes referred to as "embedded firmware," is included within the definition of software. The recitation "based on" is intended to mean "based at least in part on." Therefore, if X is based on Y, X may be based on Y and any number of other factors.

DETAILED DESCRIPTION

The following discussion is directed to various embodiments of the invention. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

Execution units implemented in various processor architectures may require one or more instruction cycles to execute an instruction. For example, a reduced instruction set architecture may execute simple instructions in a single instruction cycle, while a complex instruction set architecture may execute complex instructions in a plurality of instruction cycles. Inclusion of execution units configured to execute complex instructions allows for efficient provision of complicated functionality. However, in applications requiring timely response to interrupts, such as real-time embedded applications, execution of complex instructions, which may require thousands of instruction cycles to execute, can substantially degrade real-time performance because interrupts are conventionally recognized at instruction boundaries.

Embodiments of the processor disclosed herein include a plurality of execution units configured to execute different instructions in parallel. Embodiments of the execution units may execute complex instructions that require multiple (e.g., thousands) cycles to execute. To facilitate real-time processing, embodiments are configured to suspend execution of a complex instruction, execute a different instruction, and resume execution of the complex instruction after executing the different instruction. Embodiments allow for intra-instruction interrupts while protecting portions of execution of an instruction by implementing variable intra-instruction atomicity.

FIG. 1 shows a block diagram of a processor 100 in accordance with various embodiments. The processor 100 includes a plurality of execution units 102, 104, 106, 108. Other embodiments may include one or more execution units. The processor 100 also includes an instruction fetch unit 110, a data access unit 112, and one or more instruction decode units 114. Some embodiments further include one or more instruction buffers 116. The processor 100 may also include other components and sub-systems that are omitted from FIG. 1 in the interest of clarity. For example, the processor 100 may include data storage resources, such as random access memory, communication interfaces and peripherals, timers, analog-to-digital converters, clock generators, debug logic, etc.

One or more of the execution units 102-108 can execute a complex instruction. For example, an execution unit 102-108 may be configured to execute a fast Fourier transform (FFT), execute a finite impulse response (FIR) filter, solve a trigonometric function, evaluate a polynomial, etc. The execution units 102-108 allow complex instructions to be interrupted prior to completion of the instruction's execution. While an execution unit (e.g., EU 108) is servicing an interrupt, other execution units (EU 102-106) continue to execute other instructions. The execution units 102-108 may synchronize operation based on a requirement for a result and/or status generated by a different execution unit. For example, an execution unit 102 that requires a result value from execution unit 104 may stall until the execution unit 104 has produced the required result. One execution unit, e.g., a primary execution unit, may provide instructions to, or otherwise control the instruction execution sequence of, other execution units.

To facilitate timely interrupt service while protecting selected sequences of execution of a complex instruction, the execution units 102-108 identify which portions of an instruction are to be atomically executed. That is, the execution units recognize which portions of an instruction are to be executed without interruption. Each different instruction may specify one or more portions of the instruction to be atomically executed, and the size and number of atomically executed portions may vary from instruction to instruction.

The instruction fetch unit 110 retrieves instructions from storage (not shown) for execution by the processor 100. The instruction fetch unit 110 may provide the retrieved instructions to a decode unit 114. The decode unit 114 examines instructions, locates the various control sub-fields of the instructions, and generates decoded instructions for execution by the execution units 102-108. As shown in FIG. 1, multiple execution units may receive decoded instructions from an instruction decoder 114. In some embodiments, an instruction decoder 114 may be dedicated one or more execution units. Thus, each execution unit 102-108 may receive decoded instructions from an instruction decoder 114 coupled to only that execution unit, and/or from an instruction decoder 114 coupled to a plurality of execution units 102-108. Some embodiments of the processor 100 may also include more than one fetch unit 110, where a fetch unit 110 may provide instructions to one or more instruction decoder 114.

Embodiments of the processor 100 may also include one or more instruction buffers 116. The instruction buffers 116 store instructions for execution by the execution units 102-108. An instruction buffer 116 may be coupled to one or more execution units 102-108. An execution unit may execute instructions stored in an instruction buffer 116, thereby allowing other portions of the processor 100, for example other instruction buffers 116, the instruction fetch unit 110, and instruction storage (not shown), etc., to be maintained in a low-power or inoperative state. An execution unit may lock or freeze a portion of an instruction buffer 116, thereby preventing the instructions stored in the locked portion of the instruction buffer 116 from being overwritten. Execution of instructions stored in an instruction buffer 116 (e.g., a locked portion of an instruction buffer 116) may save power as no reloading of the instructions from external memory is necessary, and may speed up execution when the execution unit executing the instructions stored in the instruction buffer 116 is exiting a low-power state. An execution unit may call instructions stored in a locked portion of an instruction buffer 116 and return to any available power mode and/or any state or instruction location. The execution units 102-108 may also bypass an instruction buffer 116 to execute instructions not stored in the instruction buffer 116. For example, the execution unit 104 may execute instructions provided from the instruction buffer 116, instructions provided by the instruction fetch unit 110 that bypass the instruction buffer 116, and/or instructions provided by an execution unit 102, 106-108.

The instruction buffers 116 may also store, in conjunction with an instruction, control or other data that facilitate instruction execution. For example, information specifying a source of an instruction execution trigger, trigger conditions and/or trigger wait conditions, instruction sequencing information, information specifying whether a different execution unit or other processor hardware is to assist in instruction execution, etc. may be stored in an instruction buffer 116 in conjunction with an instruction.

The data access unit 112 retrieves data values from storage (not shown) and provides the retrieved data values to the execution units 102-108 for processing. Similarly, the data access unit 112 stores data values generated by the execution units 102-108 in a storage device (e.g., random access memory external to the processor 100). Some embodiments of the processor 100 may include more than one data access unit 112, where each data access unit 112 may be coupled to one or more of the execution units 102-108.

The execution units 102-108 may be configured to execute the same instructions, or different instructions. For example, given an instruction set that includes all of the instructions executable by the execution units 102-108, in some embodiments of the processor 100, all of the execution units 102-108 may be configured to execute all of the instructions of the instruction set. Alternatively, some execution units 102-108 may execute only a sub-set of the instructions of the instruction set. At least one of the execution units 102-108 is configured to execute a complex instruction that requires a plurality of instruction cycles to execute.

Each execution unit 102-108 is configured to control access to the resources of the processor 100 needed by the execution unit to execute an instruction. For example, each execution unit 102-108 can enable power to an instruction buffer 116 if the execution unit is to execute an instruction stored in the instruction buffer 116 while other instruction buffers, and other portions of the processor 100, remain in a low power state. Thus, each execution unit 102-108 is able to independently control access to resources of the processor 100 (power, clock frequency, etc.) external to the execution unit needed to execute instructions, and to operate independently from other components of the processor 100.

Figure 2:
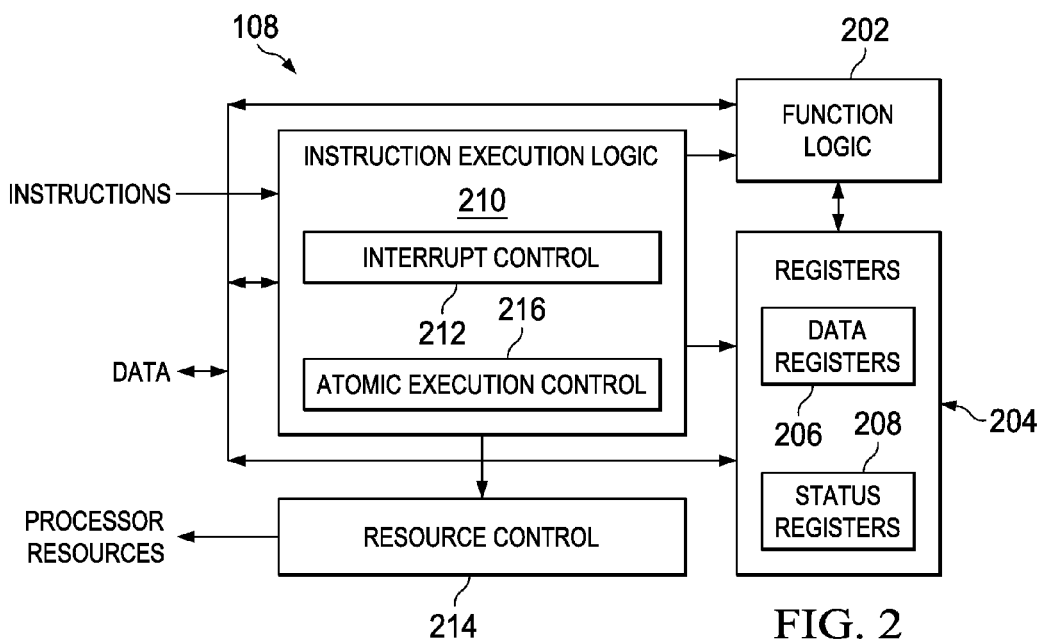
FIG. 2 shows a block diagram for an execution unit in accordance with various embodiments.

FIG. 2 shows a block diagram for an execution unit 108 in accordance with various embodiments. The block diagram and explanation thereof may also be applicable to embodiments of the execution units 102-106. The execution unit 108 includes function logic 202, registers 204, and instruction execution logic 210. The function logic 202 includes the arithmetic, logical, and other data manipulation resources for executing the instructions relevant to the execution unit 108. For example, the function logic may include adders, multipliers, shifters, logical functions, etc. for integer, fixed point, and/or floating point operations in accordance with the instructions to be executed by the execution unit 108.

The registers 204 include data registers 206 and status registers 208. The data registers 206 store operands to be processed by, and results produced by, the function logic 202. The number and/or size of registers included in the data registers 206 may vary across embodiments. For example, one embodiment may include 16 16-bit data registers, and another embodiment may include a different number and/or width of registers. The status registers 208 include one or more registers that store state information produced by operations performed by the function logic 202 and/or store instruction execution and/or execution unit state information. State information stored in a status register 208 may include a zero result indicator, a carry indicator, result sign indicator, overflow indicator, interrupt enable indicator, instruction execution state, etc. Instruction execution state reflects the current state or progress of execution of an instruction. Instruction execution state may be saved as part of interrupt service initiation and restored as part of interrupt service termination. During instruction execution, the progress and correct execution of an instruction can be verified by inspection of the instruction execution state via a debug environment.

The instruction execution logic 210 controls the sequencing of instruction execution in the execution unit 108. The instruction execution logic 210 may include one or more state machines that control the operations performed by the function logic 202 and transfer of data between the registers 204, the function logic 202, other execution units 102-106, the data access unit 112, and/or other components of the processor 100 in accordance with an instruction being executed. For example, the instruction execution logic 210 may include a state machine or other control device that sequences the multiple successive operations of a complex instruction being executed by the execution unit 108.

The instruction execution logic 210 includes interrupt control logic 212 that allows complex instructions executing in the execution unit 108 to be interrupted. The interrupt control logic 212 detects conditions, such as an interrupt event or reception of an instruction to be executed, that dictate interruption of a currently executing complex instruction. Responsive to detection of such a condition, the interrupt control logic 212 may cause the instruction execution logic 210 to suspend execution of the complex instruction and store in the registers 204, or other storage resource (e.g., a memory), information indicative of the state of the execution unit 108 at the point of suspension of execution (e.g., status register values, relevant data values, instruction execution sequence information, etc.). When the complex instruction execution state information has been saved, the instruction execution logic 210 sequences the execution unit 108 through the operations of a first interrupt service instruction, and any subsequent interrupt service instructions. On completion of the interrupt service, the instruction execution logic 210 restores the saved complex instruction execution state information to the registers 204 and the instruction execution logic 210, and resumes execution of the interrupted complex instruction.

The instruction execution logic 210 also includes atomic execution control logic 216. When the instruction execution logic 210 receives an instruction for execution, the atomic execution control logic 216 examines the instruction and determines what portions of the instruction are to be atomically executed. Atomic execution refers to non-interruptible execution. Accordingly, portions of the instruction that are atomically executed are not interruptible, and portions of the instruction that not atomically executed are interruptible. The instruction execution logic 210 executes the atomic portions of the instruction with interruption disabled and executes non-atomic portions of the instruction with interruption enabled.

The execution unit 108 also includes resource control logic 214. The resource control logic 214 requests access to the various resources (e.g., storage, power, clock frequency, etc.) of the processor 100 that the execution unit 108 uses to execute an instruction. By requesting processor resources independently for each execution unit 102-108, the power consumed by the processor 100 may be reduced by placing only components of the processor 100 required for instruction execution by an active execution unit 102-108 in an active power state. Furthermore, execution units 102-108 not executing instructions may be placed in a low-power state to reduce the power consumption of the processor 100.

Figure 3A:
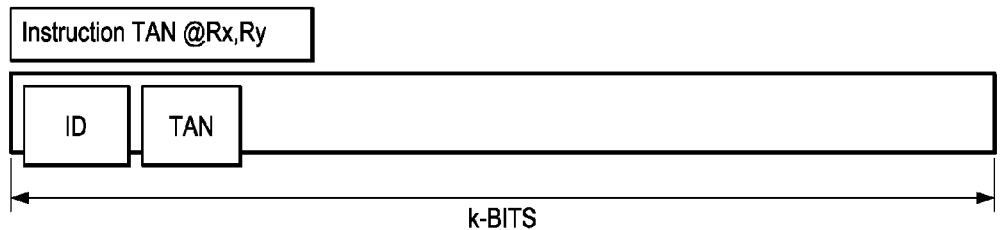
FIGS. 3A-3C show exemplary instructions that include atomicity information in accordance with various embodiments.
Figure 3B:
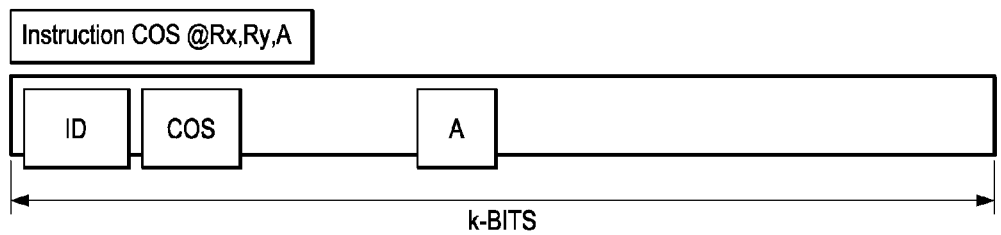
Figure 3C:
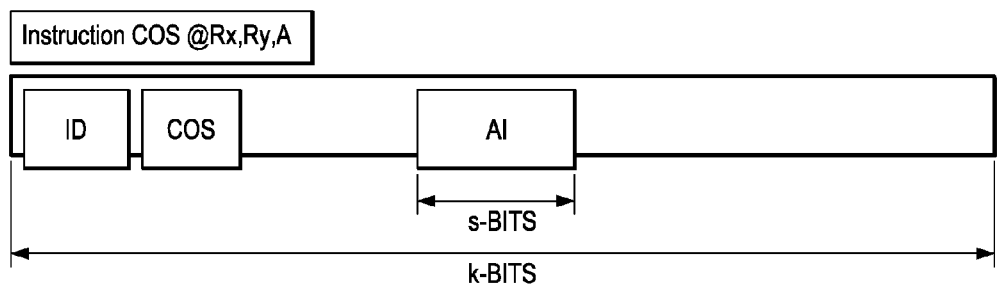

An instruction may convey atomicity information to the instruction execution logic 210 in a variety of ways. FIGS. 3A-3C show exemplary instructions that include atomicity information in accordance with various embodiments. The instruction shown in FIG. 3A does not include express designation of instruction atomicity. Instead, the instruction execution logic 210 determines the atomicity of the instruction based on the instruction ID field and/or the instruction opcode field. For example, the instruction execution logic 210 may designate a specific range of opcodes and/or IDs as being partially or wholly atomically executed. If partially atomic, the range may further define the location and duration of portions of the instruction to be atomically executed.

In FIG. 3B, the instruction includes an atomic specification field (A), which may include a single bit in some embodiments. A value extracted from the atomic specification field may indicate whether the entire instruction, a portion of the instruction, or none of the instruction is to be atomically executed.

In FIG. 3C, the instruction includes a multi-bit atomic specification field (AI). Information provided in the multi-bit atomic specification field can indicate what portions of the instruction are to be atomically executed. For example, the entire instruction execution may be atomic, an initial and/or terminal portion of the instruction execution may be atomic, and/or one or more distinct sequences of execution within the instruction may be atomic. In some embodiments, the AI field may contain the atomicity information. In other embodiments, the AI field may include information that indicates the location of atomicity information for the instruction (e.g., the AI field may include a pointer to stored atomicity information or an identifier of a register containing atomicity information, etc.).

The instruction execution logic 210 and/or an instruction specifying atomicity may define an atomic portion of instruction execution in a variety of ways. Some embodiments may define the duration of an atomic portion of instruction execution based on instruction cycles, status of execution, and/or execution unit states corresponding to execution of the instruction. For example instruction execution between instruction cycle N and N+M, state J and K, cycle N and state K, state J and cycle N, or cycle N and selected status of execution may be specified as being atomic. Status of execution may refer to availability of resources (such as registers) of an execution unit. For example, when specified execution unit resources become available for use, execution of an instruction may change from atomic to non-atomic. Additional status of execution conditions applicable to instruction atomicity include: execution results or status being stored and no register use. In some embodiments, the instruction execution logic 210 may initiate or terminate atomic execution within an instruction based on detection of a trigger event, such as a signal or flag asserted by execution of an instruction by a different execution unit or generated by hardware of the processor 100. As noted above, information specifying the portions of the instruction to be atomically executed may be directly or indirectly defined via a field of the instruction.

Some embodiments of the instruction execution logic 210 may determine how atomicity information and atomic execution of instructions should be handled based on the state of the execution unit when an instruction is received. For example, some embodiments of the instruction execution logic 210 may treat instruction atomicity differently when executing an interrupt service than when not executing an interrupt service. Some such embodiments, may disregard the atomicity information provided by an instruction (e.g., and deem the instruction wholly atomic) if the instruction is issued as part of an interrupt service. Other such embodiments may apply the atomicity information provided by the instruction only if the instruction is issued as part of an interrupt service. Some embodiments may apply atomicity differently based on various other execution unit conditions, such as operating mode and/or power mode.

In some embodiments of the instruction execution logic 210, the handling of instruction atomicity may be based on the execution unit to which the instruction is issued. For example, some execution units may be configured to enforce instruction atomicity per the atomicity information provided by the instruction. Other execution units may apply different rules with regard instruction atomicity (e.g., all instructions atomic, no instructions atomic, atomic only in interrupt service, etc.).

The instruction execution logic 210 may conditionally atomically execute a portion of an instruction. In such embodiments, the AI field may include level indication information. The instruction execution logic 210 may extract the level indication information from the AI field and compare the level indication information to a reference level value (e.g., a level value stored in the execution unit). The instruction execution logic 210 may determine whether to atomically execute the portion of the instruction based on a result of the comparison. For example, if the reference level value is less than a level value derived from the level indication information then the instruction execution logic may atomically execute the portion of the instruction. In other embodiments, the instruction execution logic 210 may atomically execute the portion of the instruction based on a different relationship between the reference level value and the level value derived from the level indication information (e.g., reference level value>level value derived from the level indication information derived level value, reference level value=level value derived from the level indication information derived level value, etc.).

FIG. 4 shows an exemplary instruction flow incorporating fully atomic execution of instructions in accordance with various embodiments. In FIG. 4, each instruction (EUI1-EUI7) is executed to completion in the order of issuance to the execution unit. The atomicity of the instructions may be specified via a field of the instruction as explained above. At least some of the instructions are complex instructions that require multiple instruction cycles to execute. As shown in FIG. 4, execution of instructions EUI3-EUI7 is delayed (relative to the time of issue) to allow execution of previously issued atomically executed instructions to complete.

FIG. 5 shows an exemplary instruction flow incorporating atomic and partially atomic execution of instructions in accordance with various embodiments. As in FIG. 4, instructions EUI1-EUI7 are issued to an execution unit. The execution unit examines each instruction for atomic execution information and executes the instruction in accordance with atomic execution parameters specified via the instruction. Instruction EUI1 is fully executed without interruption. During execution of instruction EUI2, instruction EUI3 is issued to the execution unit. However, instruction EUI2 is fully atomic, or at least a portion of EUI2 from just prior to issuance of EUI3 to termination of EUI2 is atomic. Consequently, execution of instruction EUI2 is non-interruptible when EUI3 is issued, and the execution unit initiates execution of EUI3 after completion of EUI2 execution.

Instruction EUI4 specifies partially atomic execution. An initial portion of instruction EUI4 is atomically executed. During execution of the initial atomic portion, instruction EUI5 is issued for execution. When execution of the initial atomic portion of instruction EUI4 is complete, execution of instruction EUI4 is suspended and instruction EUI5 is executed. When execution of instruction EUI5 is complete, execution of instruction EUI4 is resumed with execution of a second atomic portion. During execution of the second atomic portion, instruction EUI6 is issued for execution. When execution of the second atomic portion of instruction EUI4 is complete, execution of instruction EUI4 is suspended and instruction EUI6 is executed. An initial portion instruction EUI6 is atomically executed, and during execution of the initial atomic portion of instruction EUI6, instruction EUI7 is issued. When execution of the initial atomic portion of instruction EUI6 is complete, execution of instruction EUI6 is suspended and instruction EUI7 is executed to completion. When execution of instruction EUI7 is complete, execution of instruction EUI6 is resumed and continues to completion. When execution of instruction EUI6 is complete, execution of instruction EUI4 is resumed and continues to completion.

Figure 6:
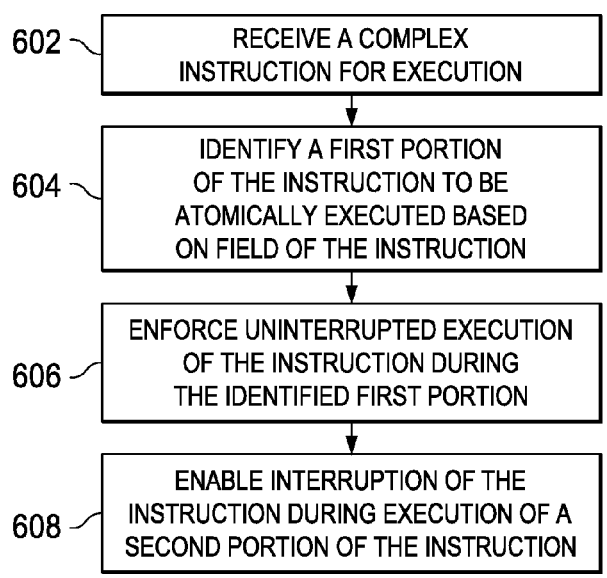
FIG. 6 shows a flow diagram for a method for executing a complex instruction by a processor in accordance with various embodiments.

FIG. 6 shows a flow diagram for a method for executing a complex instruction by a processor in accordance with various embodiments. Though depicted sequentially as a matter of convenience, at least some of the actions shown can be performed in a different order and/or performed in parallel. Additionally, some embodiments may perform only some of the actions shown.

In block 602, a complex instruction is issued to an execution unit (e.g., execution unit 104) of the processor 100 for execution. The complex instruction (e.g., an FFT instruction) may require many instruction cycles to execute.

In block 604, the execution unit 104 examines the instruction, and based on a field of the instruction, identifies a portion of the instruction that is to be atomically executed. The field of the instruction may be an instruction identification field, an opcode field, or an atomic execution parameter specification field. The field may contain information specifying a portion of the instruction to be atomically executed, or may indicate a location of information specifying a portion of the instruction to be atomically executed.

Via the information provided by the field, the execution unit may determine a starting point for a portion of the instruction to be atomically executed, a duration for a portion of the instruction to be atomically executed, and/or an initiating/terminating event for a portion of the instruction to be atomically executed (e.g., instruction cycle number, execution unit/instruction state, trigger event, etc.). The information provided via the field may specify a plurality of distinct portions of the complex instruction to be atomically executed.

In block 606, the execution unit executes the complex instruction, and enforces uninterrupted (atomic) execution of the portion of the instruction identified to be atomically executed. Execution of any additional instructions received during execution of the atomic portion of the instruction is delayed until execution of the atomic portion of the instruction is complete.

In block 608, execution of the atomic portion of the instruction is complete, and the execution unit enables interruption of the complex instruction during execution of a second portion of the instruction. Thus, instructions issued to the execution unit for execution during the atomic portion of the complex instruction's execution may be executed during the second (non-atomic) portion of the complex instruction's execution. Similarly, instructions issued to the execution unit for execution during the non-atomic portion of the complex instruction's execution may preempt execution of the complex instruction.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. A processor, comprising:
a plurality of execution units, at least one of the execution units is configured to:
execute a first complex instruction that requires multiple instruction cycles to execute;
enforce atomic execution of the first complex instruction during a first-portion of the multiple instruction cycles required to execute the first complex instruction;
enable execution of the first complex instruction to be interrupted for execution of a second instruction by the at least one execution unit during execution of a second portion of the multiple instruction cycles; and
enforce non-atomic execution of the first complex instruction during the second portion of the multiple instruction cycles required to execute the first complex instruction;
wherein the first portion and the second portion are non-overlapping.

2. The processor of claim 1, wherein the at least one of the execution units is configured to define at least one of the first portion and the second portion based on at least one of an opcode and an instruction identifier of the first complex instruction.

3. The processor of claim 1, wherein the at least one of the execution units is configured to define at least one of the first portion and the second portion based on an atomic specification field of the first complex instruction.

4. The processor of claim 3, wherein the atomic specification field comprises at least one of:
information defining one of the first portion and the second portion; and
an indicator of a location of information defining one of the first portion and the second portion.

5. The processor of claim 1, wherein the at least one of the execution units is configured to define at least one of the first portion and the second portion based on at least one of a specified instruction cycle, a specified execution unit state, a specified status of execution, and occurrence of a predetermined trigger event.

6. The processor of claim 1, wherein the at least one of the execution units is configured to initiate the first portion at an initial instruction cycle of the first complex instruction and terminate the first portion prior to a last instruction cycle of the first complex instruction.

7. The processor of claim 1, wherein the at least one execution unit is configured to initiate the first portion after an initial instruction cycle of the first complex instruction and terminate the first portion at a last instruction cycle of the first complex instruction.

8. The processor of claim 1, wherein the at least one execution unit is configured to initiate the first portion after an initial instruction cycle of the first complex instruction and terminate the first portion prior to last instruction cycle of the first complex instruction.

9. The processor of claim 1, wherein the at least one execution unit is configured to define the first portion and the second portion based on whether the first complex instruction is being executed in one of a specified operating mode, a specified power mode, and an interrupt service routine.

10. An execution unit for executing instructions in a processor, the execution unit comprising:
instruction execution logic configured to:
execute a first complex instruction that requires a plurality of instruction cycles to execute;
impose atomic execution of the first complex instruction during a first-portion of the plurality of instruction cycles required to execute the first complex instruction;
enable execution of the first complex instruction to be interrupted for execution of a second instruction by the execution unit during execution of a second portion of the plurality of instruction cycles; and
impose non-atomic execution of the first complex instruction during the second portion of the plurality of instruction cycles required to execute the first complex instruction;
wherein the first portion and the second portion are non-overlapping.

11. The execution unit of claim 10, wherein the execution unit is configured to define at least one of the first portion and the second portion based on one of an opcode, an instruction identifier, and an atomic specification field of the first complex instruction.

12. The execution unit of claim 11, wherein the atomic specification field comprises at least one of:
information defining one of the first portion and the second portion; and an indicator of a location of information defining one of the first portion and the second portion.

13. The execution unit of claim 10, wherein the execution unit is configured to define at least one of the first portion and the second portion based on at least one of a specified instruction cycle, a specified instruction state, a specified status of execution, and occurrence of a predetermined trigger event.

14. The execution unit of claim 10, wherein the execution unit is configured to initiate the first portion at a first instruction cycle of the first complex instruction and terminate the first portion prior to a last instruction cycle of the first complex instruction.

15. The execution unit of claim 10, wherein the execution unit is configured to initiate the first portion after a first instruction cycle of the first complex instruction and terminate the first portion at a last instruction cycle of the first complex instruction.

16. The execution unit of claim 10, wherein the execution unit is configured to initiate the first portion after a first instruction cycle of the first complex instruction and terminate the first portion prior to last instruction cycle of the first complex instruction.

17. The execution unit of claim 10, wherein the execution unit is configured to define at least one of the first portion and the second portion based on whether the first complex instruction is being executed in one of a specified operating mode, a specified power mode, and an interrupt service routine.

18. The execution unit of claim 10, wherein the atomic specification field comprises level indication information and the execution unit is configured to:
compare the level indication information to a reference level value; and
conditionally impose the atomic execution based on a result of the comparison.

19. A method for executing an instruction in an execution unit of a processor, comprising:
executing, by the execution unit, a first complex instruction requiring a plurality of instruction cycles to execute;
enforcing, by the execution unit, atomic execution of the first complex instruction during a first-portion of the plurality of instruction cycles required to execute the first complex instruction;
enabling, by the execution unit, execution of the first complex instruction to be interrupted for execution of a second instruction by the execution unit during execution of a second portion of the plurality of instruction cycles; and
enforcing, by the execution unit, non-atomic execution of the first complex instruction during the second portion of the plurality of instruction cycles required to execute the first complex instruction;
wherein the first portion and the second portion do not overlap.

20. The method of claim 19, further comprising defining, by the execution unit, at least one of
the first portion and the second portion based on one of an opcode,
an instruction identifier, and
an atomic specification field of the first complex instruction.

21. The method of claim 20, further comprising extracting from the atomic specification field at least one of:
information defining one of the first portion and the second portion; and
an indicator of a location of information defining one of the first portion and the second portion.

22. The method of claim 19, further comprising defining, by the execution unit, at least one of the first portion and the second portion based on at least one of a specified instruction cycle, a specified execution unit state, and occurrence of a predetermined trigger event.

23. The method of claim 19, further comprising initiating, by the execution unit, the first portion at an initial instruction cycle of the first complex instruction and terminating the first portion prior to a last instruction cycle of the first complex instruction.

24. The method of claim 19, further comprising initiating, by the execution unit, the first portion after an initial instruction cycle of the first complex instruction and terminating the first portion at a last instruction cycle of the first complex instruction.

25. The method of claim 19, further comprising initiating, by the execution unit, the first portion after an initial instruction cycle of the first complex instruction and terminating the first portion prior to last instruction cycle of the first complex instruction.

26. The method of claim 19, further comprising defining, by the execution unit, at least one of the first portion and the second portion based on whether the first complex instruction is being executed in one of a specified operating mode, a specified power mode, and an interrupt service routine.

* * * * *